United States Patent
Jávori

(10) Patent No.: US 12,448,337 B2
(45) Date of Patent: Oct. 21, 2025

(54) METHOD OF SHAPING A CARRIER SHEET OF HIGH HARDNESS

(71) Applicant: SENSONIC DESIGN ZRT., Györ (HU)

(72) Inventor: Dávid Vilmos Jávori, Budapest (HU)

(73) Assignee: SENSONIC DESIGN ZRT., Györ (HU)

( * ) Notice: Subject to any disclaimer, the term of this patent is extended or adjusted under 35 U.S.C. 154(b) by 263 days.

(21) Appl. No.: 18/130,607

(22) Filed: Apr. 4, 2023

(65) Prior Publication Data

US 2023/0322635 A1 Oct. 12, 2023

Related U.S. Application Data

(60) Provisional application No. 63/327,828, filed on Apr. 6, 2022.

(51) Int. Cl.
| | | |
|---|---|---|
| *C04B 41/53* | (2006.01) | |
| *B24C 1/10* | (2006.01) | |
| *C04B 41/00* | (2006.01) | |

(52) U.S. Cl.
CPC ............ *C04B 41/5346* (2013.01); *B24C 1/10* (2013.01); *C04B 41/0036* (2013.01); *C04B 41/009* (2013.01)

(58) Field of Classification Search
CPC ........... B32B 9/00; B32B 11/00; B32B 29/00; B32B 9/002; B32B 17/06; B32B 7/12; B32B 2038/0064; B32B 2307/412; B32B 2310/0831; B32B 2315/08; B32B 2318/04; B44C 5/0407; B44C 5/0438; B44C 5/06; B44C 5/08; Y10T 156/1062; Y10T 156/1082
See application file for complete search history.

(56) References Cited

U.S. PATENT DOCUMENTS

| | | | |
|---|---|---|---|
| 5,004,512 A * | 4/1991 | Fodera | B32B 3/12 428/116 |
| 5,078,815 A * | 1/1992 | Othon | B44C 5/0438 156/154 |
| 2021/0114749 A1* | 4/2021 | Humfeld | B64F 5/10 |

FOREIGN PATENT DOCUMENTS

| | | | | |
|---|---|---|---|---|
| CN | 104326649 A | * | 2/2015 | |
| EP | 1527872 A1 | * | 5/2005 | ............. B32B 17/06 |
| KR | 101613915 B1 | * | 4/2016 | |
| WO | WO-2024046480 A1 | * | 3/2024 | |

OTHER PUBLICATIONS

English translation of EP-1527872-A1 by EPO. (Year: 2005).*
English translation of CN-104326649-A by EPO. (Year: 2015).*
English translation of KR-101613915-B1 by EPO. (Year: 2016).*
English translation of WO-2024046480-A1 by EPO. (Year: 2024).*

* cited by examiner

*Primary Examiner* — Xiao S Zhao
*Assistant Examiner* — Inja Song
(74) *Attorney, Agent, or Firm* — Daniel S. Kim

(57) ABSTRACT

The present invention generally relates to one or more methods for shaping or machining a rigid carrier sheet which in particular can include one or methods for forming cavities on one side of a rigid carrier sheet in a predetermined pattern for mounting electronic units.

7 Claims, 2 Drawing Sheets

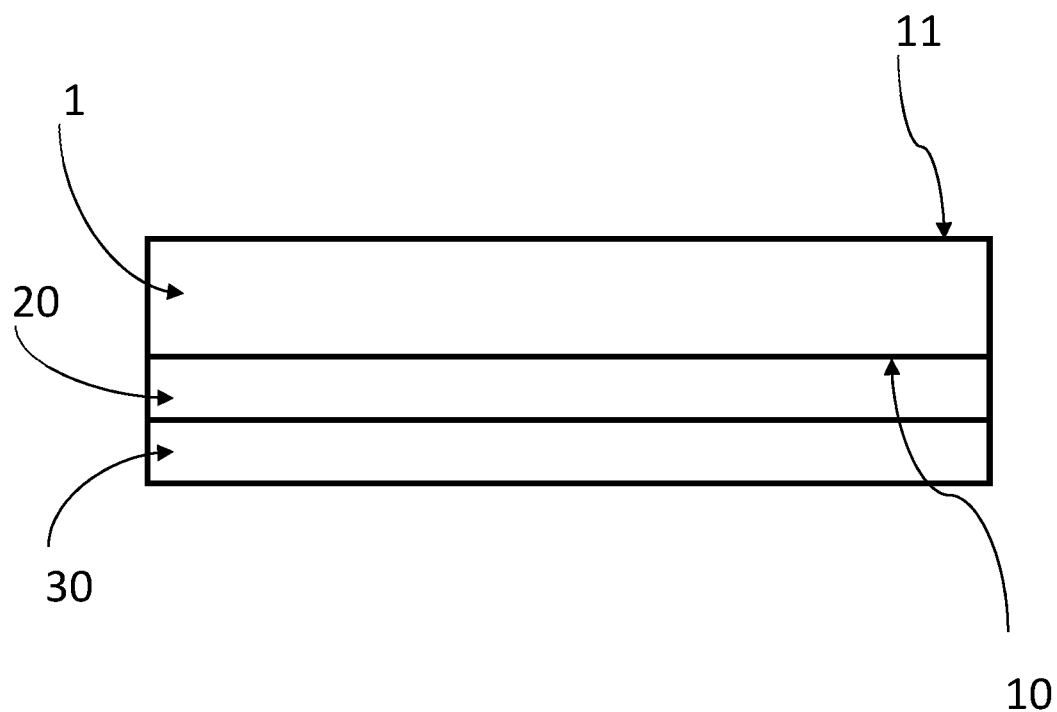
FIG. 2.a
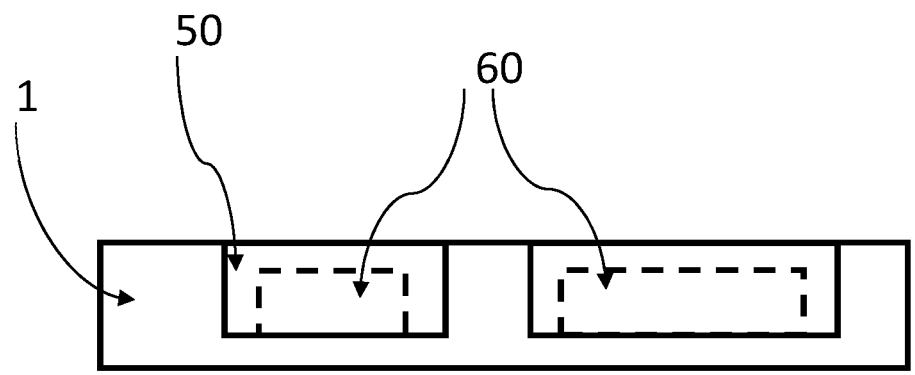
FIG. 2.b

METHOD OF SHAPING A CARRIER SHEET OF HIGH HARDNESS

TECHNICAL FIELD

The present invention relates to a method of machining a high hardness carrier sheet, and more particularly to a method of forming cavities on one side of a carrier sheet of high hardness in a predetermined pattern for mounting electronic units therein.

BACKGROUND

Cladding and decorative elements made of natural and artificial materials such as stone, machined wood, natural wood, composite materials, plastic or a combination thereof are preferred in the construction industry. Various opaque tiles are thinned in certain areas to such an extent that they can function as a display surface, for example, they are suitable for displaying pictograms and animations. Sufficient thinning of high-strength carrier sheets in relatively small size ranges, such as a few centimeters in diameter, is a major technological challenge with currently known mechanical machining techniques.

The patent document ES1129455 discloses a robot cell for cutting, milling, grinding and polishing large sheets of natural material. The multi-axis robot can also be equipped with a water jet head for individual machining of boards.

The patent document CN109968543 describes machining of a product made of natural stone. The stone products have at least one light-transmitting surface and at least one light source illuminating the light-transmitting surface. If the light source built into the stone product is not active, only the natural pattern of the rock is visible on the surface of the stone product. The wall thickness of the translucent surface is between 0.5 mm and 3.5 mm by sawing, sanding and polishing.

The disadvantage of the above solutions is that when thinning carrier sheets of high-hardness, the light transmitted through the surface suffers a significant attenuation due to the relatively high roughness of the machined inner surfaces, which necessitates the installation of relatively high and therefore large electronic light emitting units. Large-scale electronics require the cutting of wide cavities, which on the one hand, weakens the mechanical strength of the carrier sheet as a whole, and on the other hand, significantly reduces the resolution of the image that can be displayed.

In addition, prior art machining processes can cause breakage and hairline cracks in the carrier sheet's material, resulting in quality problems or loss of production.

It is an object of the present invention to improve the prior art methods of processing carrier sheets of high hardness to enable such carrier sheets to display higher resolution images without significantly reducing the maximum available light intensity.

BRIEF SUMMARY

The above object is achieved by a method for shaping a carrier sheet of high hardness, in particular a gres sheet, the method comprising the steps of:
providing a solid carrier sheet of high hardness having a thickness of at least 6 mm;
covering a front surface of the carrier sheet with a removable vibration-absorbing protective layer;
providing the surface of the protective layer remote from the carrier sheet with a glass sheet;
on the back surface of the carrier sheet opposite the front surface thereof, forming a plurality of cavities according to a predetermined pattern, the step of forming comprising:
forming the cavities by milling so that in each cavity the remaining thickness of the carrier sheet along the front surface is at least 3 mm and at most 5 mm;
during milling, at least one physical property of the vibration of the carrier sheet is continuously measured on the front surface of the carrier sheet by means of at least one sensor;
on the basis of at the least one physical property measured by the sensor, adjusting the operation of the milling tool so that the vibration properties of the carrier sheet do not exceed predetermined threshold values;
by applying a first optical method, taking a first 3D image of the surface roughness of the milled cavities;
further reducing the surface roughness of the cavities by shot blasting, wherein during the shot blasting, the operation of the shot blasting tool is controlled using parameters determined on the basis of the first 3D image taken during the first scanning;
by applying a second 3D scanning, taking a second 3D image of the surface roughness of the cavities treated by said shot blasting; and
by applying laser beam milling, further reducing the surface roughness of the cavities, wherein the operation of the laser beam milling tool is controlled on the basis of the second 3D image taken by the second 3D scanning after the shot blasting so that the surface roughness of the cavities falls in the submicron range.

Preferred embodiments of the method according to the invention are defined in the dependent claims.

BRIEF DESCRIPTION OF THE DRAWINGS

The process according to the invention will now be described in more detail with reference to the drawings. In the drawings:

FIGS. 2a and 2b are schematic sectional views of the shaped carrier sheet before and after shaping.

DETAILED DESCRIPTION

Figure 1:
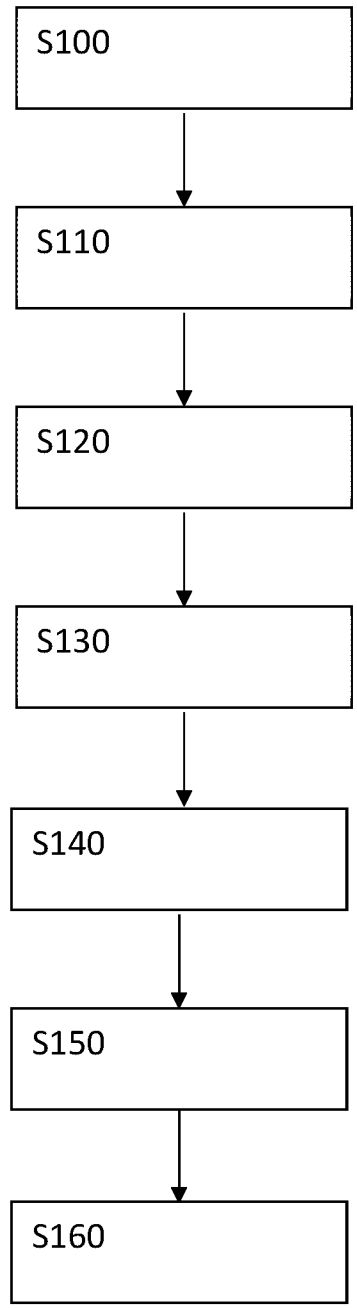
FIG. 1 is a flow diagram illustrating the main steps of the shaping method according to the invention.

As used herein, a "carrier sheet of high hardness" is a sheet of rigid, natural or man-made material that is opaque to a commercially available thickness, but which, when sufficiently thinned, can be illuminated with light sources of relatively low power. Such materials include gres, stoneware, natural marble, artificial marble, concrete, and the like. The carrier sheet can be a wall tile, a floor tile, a home furniture tile, an office furniture tile, a multi-function table top, a stand-alone display panel, a worktop, etc., depending on the purpose of use.

The main steps of the method according to the invention are described with reference to the flow diagram shown in FIG. 1. The shaping process is performed on a carrier sheet 1 shown in FIG. 2a in a sectional view.

The carrier sheet 1 is an initially solid sheet having a front surface 10, which is generally the surface of the carrier sheet 1 visible to the user. On the side opposite the front surface 10, the carrier sheet 1 has a back surface 11, in which the electronic units necessary for illuminating the carrier sheet 1 are mounted. In order to be able to illuminate the carrier sheet 1, it is thinned from the direction of the back surface 11. The back surface 11 of the carrier sheet 1 is generally not visible to the user during use, after the carrier sheet 1 has been installed.

The typical size of the carrier sheet 1 shaped by the method is at least 100 mm×100 mm, typically 1200 mm×1200 mm, but not more than 6000 mm×2000 mm. The thickness of the carrier sheet 1 before shaping is typically at least 6 mm.

Prior to the start of the shaping process, the carrier sheet 1 is preferably cleaned, for example by alcohol or other cleaning agents, so as to completely remove the organic and inorganic contaminants, such as fats or any auxiliaries which may have come into contact with the carrier sheet 1, from its front surface 10 and back surface 11.

In the first step S100 of the method according to the invention, the front surface 10 of the carrier sheet 1 is covered with a protective layer 20. The protective layer 20 is preferably a high-tensile plastic film. By using the protective layer 20, the micro-vibrations of the carrier sheet 1 caused by the mechanical processing means can be significantly reduced during the shaping steps. The elimination of micro-vibrations is necessary because the aim of the high-precision surface treatment is to achieve a surface roughness smaller than the amplitude of such micro-vibrations. In the present invention, the protective layer 20 may be, for example, the protective film 'Protect' of the company 3M having a thickness of 50 to 500 μm. The protective layer 20, in particular the plastic protective film, is electrostatically fixed to the front surface 10 of the carrier sheet 1, so that the protective layer 20 can be removed from the carrier sheet 1 at the end of the shaping process or at a later time thereafter. Since the protective layer 20 remains on the carrier sheet 1 throughout the process, it also protects the front surface 10 from mechanical impacts, such as chips, dirt, scratches and low-power shocks.

In a further step S110 of the method, a glass sheet 30 with a thickness of at least 4 mm is placed on the surface of the protective layer 20 opposite the carrier sheet 1, which is glued to the carrier sheet 1 (more precisely to its protective layer 20). Since the glass sheet 30 is mechanically consistent with the material of the carrier sheet 1, it further increases the rigidity of the carrier sheet 1 and further reduces the micro-vibrations resulting from machining and distributes well the locally generated mechanical stresses on the carrier sheet 1 due to mechanical loads. Therefore its use prevents the formation of undesired hairline cracks in the carrier sheet 1 during machining.

The glass sheet 30 and the protective layer 20 together form a transparent layer on the front surface of the carrier sheet 1, thus any material structural defects in the front surface 10 of the carrier sheet 1 can be detected already during the shaping process.

On the one hand, the glass sheet 30 provides mechanical, static rigidity to the carrier sheet 1 up to the final stage of machining, and since it forms an integral part of the carrier sheet 1, it also protects the front surface 10 of the carrier sheet 1 from external influences. The carrier sheet 1 provided with the protective layer 20 and the glass sheet 30 can be arranged in a fastening frame for moving and machining, which holds the sandwich-like layers together during both machining and subsequent installation.

After the application of the protective layer 20 and the glass sheet 30, the cavities 50, into which the light emitting electronic units can be inserted, are formed on the back surface 11 of the carrier sheet 1. The shaping is started in step S120 by milling. The milling is preferably carried out using a CNC machine, for example the milling center 'Profile 6033 CNC' from CMS. Based on a predetermined pattern of the cavities 50 to be formed, the machining plan is prepared and then the toolpaths are generated using the software of the CNC machine. The cavities 50 to be formed are typically formed with a floor area between 100 mm×100 mm and 1900 mm×1100 mm, depending on the function of the electronic units to be installed. The CNC milling in step S120 creates the cavities 50 in the carrier sheet 1 with a typical accuracy of tenths of a millimeter, but optionally up to a hundredth or a thousandth of a millimeter. For example, for a carrier sheet 1 having thickness of 6 mm, each cavity 50 is formed by removing a thickness of approx. 2.1 mm, i.e. the thickness of the thinned parts of the carrier sheet 1 will be approx. 3.9 mm, which in the case of gres sheets, for example, results in a sufficiently reduced thickness to allow its transillumination by a laser light source having a power of 0.1-30 W (e.g. laser matrix or laser projector).

Some factors that greatly influence the choice of technological parameters of the milling operation in step S120 include the following:

- the composition of the material of the given carrier sheet 1 because gres, stoneware or marble is not a completely consistent material;
- the humidity and the temperature in the vicinity of the carrier sheet 1 because if too many parameters of the material change during the milling of the carrier sheet 1, it can lead to breakage;
- the thickness of the carrier sheet 1 because the material loses its strength during thinning, thus cracks may appear on the front surface 10 or the back surface 11 of the carrier sheet 1.
- the position of the cavity 50 to be machined on the carrier sheet 1, i.e. if, for example, a cavity 50 is located at the edge of the carrier sheet 1, the cutting speed must be increased, for example by increasing the tool speed, which amplifies the micro-vibrations in the material;
- the thickness of the thinned parts of the carrier sheet 1 because the cutting speed must also be increased when machining the bottom of the cavity 50, which also amplifies the micro-vibrations formed in the material on the thinned parts.

In order to reduce or eliminate the adverse effects described above, the carrier sheet 1 provided with the protective layer 20 and the glass sheet 30 is preferably placed on a vacuum work table, where the entire area of the carrier sheet 1 is fixed to the work table with a substantially uniform force distribution. However, in order to avoid an increase in the internal stress in the material as a result of the machining, the vacuum fixation allows the carrier sheet 1 to resonate to a small extent.

In order to avoid high resonance, in step S120, a real-time resonance test is performed on the carrier sheet 1 during milling, as a result of which the machining parameters such as CNC machine speed, milling head feed, coolant flow rate, etc. are continuously controlled so that the vibration properties of the carrier sheet 1 do not exceed predetermined threshold values.

During the resonance test, various physical properties of the carrier sheet 1, such as the vibration amplitude, the vibration frequency, the lateral propagation of the vibrations, etc. can be measured. The resonance test can be performed in several ways, such as:

physical vibration measurement in the four corners of the carrier sheet 1, preferably by means of sensors;

optical vibration measurement at a minimum of four points in the range of 80 mm to 200 mm from the surface to be machined, preferably by a laser measurement system; and vibration measurement along the entire surface of the carrier sheet 1, preferably by means of a camera system.

During the milling in step S120, the sound effects can also be examined in order to deduce any defects in the material. If, for example, an imbalance occurs during drilling at the beginning of the milling, the sound effect of the machining changes, thus it may be learned even before the formation of cracks that some technological parameter is not appropriate. The sound effects that have changed as compared to pre-stored sound samples can indicate, for example, the following problems: drill bit wear, support movement, change of the rotational speed, change of the coolant volume, and so on.

When milling materials of high hardness, such as gres, diamond-coated milling heads with a diameter of between 1.5 mm and 4 mm are preferably used. During milling, the rotational speed of the CNC machine is preferably regulated in the range of 7,500 to 12,000 rpm.

Since the thinned areas in the cavities 50 may be macroscopically wavy due to the small vibrations of the carrier sheet 1 during milling, the thickness of the carrier sheet 1 after cutting is uneven and the machining tools leave grooves and tracks on the surface of the cavities 50. These surface irregularities are optically imaged with a first image resolution in step S130 of the method. The image is preferably captured by optical scanning, so-called scanning, where the scanning is performed with an image resolution of 10-500 μm. The purpose of 3D scanning of the surfaces is to allow the surface of the cavities 50, in particular the inner surface of the thinned portions, to be further refined for transparency in the next shaping step, or in other applications to achieve sensory detection or fluid excitation.

After the first scanning step, the irregularities created by the milling on the inner surfaces of the cavities 50 in step S140 of the method are further reduced by shot blasting. As a result of the surface scanning in step S130, a 3D image is obtained of the grooves and troughs formed on the surface of the cavities 50. Based on this 3D image, the edges of the troughs created by the milling head of the CNC machine are blown, but only to the extent for obtaining a sufficiently smooth surface for an additional surface smoothing step.

In the method of the present invention, in step S140, the inner surfaces of the cavities 50 are preferably sandblasted. For this purpose, a sandblasting system is preferably used, with which a surface roughness of approx. 10 μm can be achieved. The sandblasting system is preferably operated with the operational parameters determined on the basis of analyzing the 3D image obtained during the scanning in step S130. Preferably, the flow rate of the particles can be controlled. Several types of sand can be used during sandblasting, the grain size of the applied sand may be between 11 μm and 800 μm. The sandblasting head is continuously moved by a robot arm so that the sandblasting head never returns to the same surface point and always follows a different path on the carrier sheet 1. Convex surfaces can also be machined with a sandblasting head having a robotic arm tilting mechanism. The sandblasting system may be, for example, the sandblasting system 'Mistral Zephir' of the company Fratelli Pezza, but other systems may also be used for other production parameters.

During the shaping in step S140, not only sandblasting but also other types of blasting media, such as steel or corundum grains, may even be used.

After shot blasting, another step of 3D scanning with an image resolution higher than that was used in the first scanning step is performed in step S150 of the method. During the scanning in step S150, 3D images with a resolution of preferably 1 to 10 m are taken of the inner surface of the cavities 50.

Following the shot blasting, in step S160 of the method, an extremely precise finishing is performed on the inner surfaces of the cavities 50 using a milling head of the excimer laser beam type to create substantially polished surfaces. By applying the this laser beam milling, no further significant amount of material is removed, only the surfaces of the cavities 50 are made to be completely uniform, as a result of which the thickness of the carrier sheet 1 in the thinned areas will be entirely the same (at least the change in thickness falls within a submicron tolerance range).

During the laser beam milling, it is preferred to continuously measure the resonance of the carrier sheet 1 again by means of the integrated sensors and to control the operating parameters of the laser beam milling machine on the basis of the measurement data.

During the laser beam milling in step S150, a standard industrial excimer laser beam milling machine is preferably used, wherein the laser beam emitting head is moved into the surface region to be machined by means of a driver unit on a machining station. The surfaces obtained as a result of the laser beam milling are already smooth enough for the light of the light sources 60 placed in the cavities 50 to pass through the material of the carrier sheet 1 with a minimum of loss (reflection, scattering).

The carrier sheet 1 produced by the method according to the invention is illustrated in FIG. 2b in a sectional view.

The advantage of the method according to the invention is that, as a result of the multi-step shaping, extremely thin surface areas can be economically formed on one side of a carrier sheet of high hardness according to a predefined pattern so that the inner surface of the cavities behind the thinned areas is very fine and machined to be extremely uniform in thickness.

Although the method of shaping a carrier sheet has been described herein in connection with the mount of electronic light emitting units therein, it will be apparent to those skilled in the art that the cavities in the groove may be used to mount other functional electronic units as well. For example, a fluid exciter for sound generation or other electronic units performing sensor detection or heating/cooling may also be mounted into the carrier sheet behind the thinned surface areas.

The invention claimed is:

1. A method for shaping a rigid carrier sheet, the method comprising the steps of:

providing the rigid carrier sheet having a thickness of at least 6 mm;

covering a front surface of the rigid carrier sheet with a removable vibration-absorbing protective layer;

providing the surface of the protective layer remote from the rigid carrier sheet with a glass sheet;

on the back surface of the rigid carrier sheet opposite the front surface thereof, forming a plurality of cavities according to a predetermined pattern, the step of forming comprising:

forming the cavities by milling so that in each of the cavities a remaining thickness of the rigid carrier sheet along the front surface is at least 3 mm and at most 5 mm;

during said milling, at least one physical property of the vibration of the rigid carrier sheet is continuously measured on the front surface of the rigid carrier sheet by means of at least one sensor;

on the basis of at the least one physical property measured by the sensor, adjusting the operation of a milling tool so that the vibration properties of the rigid carrier sheet do not exceed predetermined threshold values;

by applying a first scanning, taking a first 3D image of the surface roughness of the milled cavities;

further reducing the surface roughness of the milled cavities by shot blasting, wherein during the shot blasting, the operation of a shot blasting tool is controlled using parameters determined on the basis of the first 3D image taken during the first scanning;

by applying a second scanning, taking a second 3D image of the surface roughness of the cavities treated by the shot blasting; and by applying laser beam milling, further reducing the surface roughness of the shot blasted cavities, wherein the operation of a laser beam milling tool is controlled on the basis of the second 3D image taken by the second scanning after said shot blasting so that the surface roughness of the laser-beam-milled cavities falls in a submicron range.

2. The method of claim 1, wherein the protective layer is a protective film with a thickness of 50 to 500 m, which is electrostatically fixed to the front surface of the rigid carrier sheet.

3. The method of claim 1, wherein during the first scanning, the image resolution of the scan is 10 to 50 µm, and during the second scanning, the image resolution is 1 µm to 10 µm.

4. The method of claim 1, wherein the step of the shot blasting comprises sandblasting.

5. The method of claim 1, wherein in the step of milling, a rotational speed is controlled in a range of 7,500 to 12,000 rpm.

6. The method of claim 1, wherein a material of the rigid carrier sheet is selected from the group of glass, wood veneer, composite wood, acrylic, metal, gres, stoneware, natural marble, artificial marble, granite and concrete.

7. The method of claim 1, wherein the rigid carrier sheet has a width of at least 100 mm and a length of at least 100 mm.

* * * * *